Figure 1:
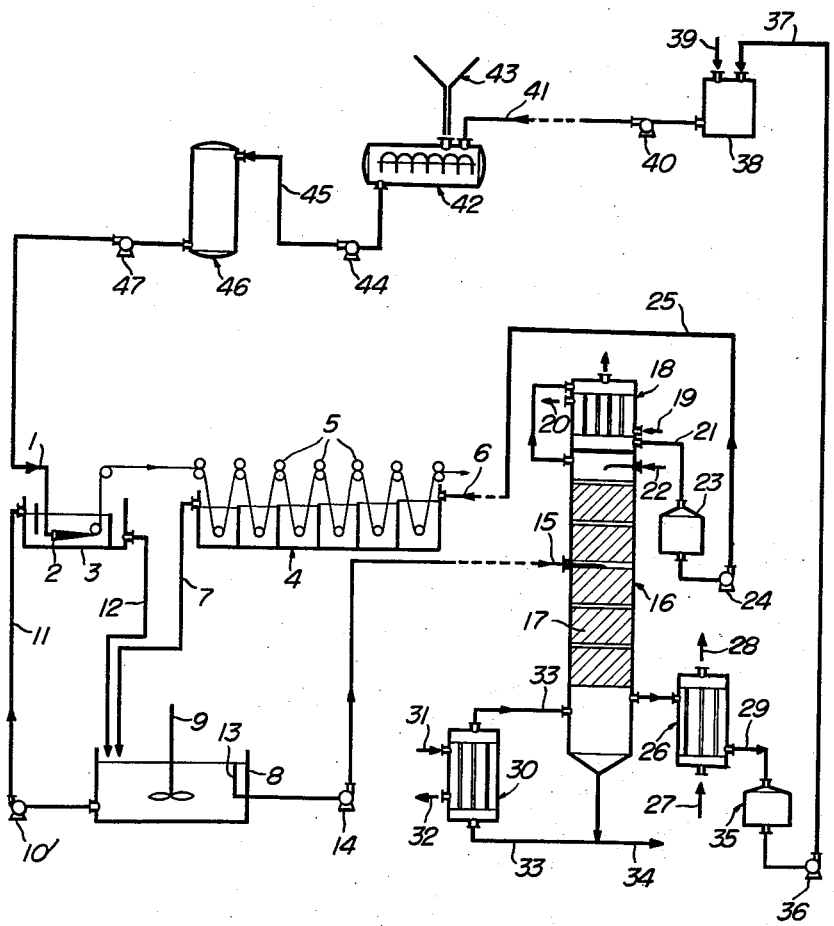

United States Patent Office 3,107,971
Patented Oct. 22, 1963

3,107,971
PROCESS FOR RECOVERING NITRIC ACID AND WATER FROM COAGULATING BATHS USED IN MAKING SHAPED ACRYLONITRILE POLYMERIZATION PRODUCTS
Masahide Yasawa, Numazu-shi, Shigezo Kojima and Shizuo Takahashi, Yoshihara-shi, and Kenji Doi, Fujishi, Japan, assignors to Asahi Kasei Kogyo Kabushiki Kaisha, Kita-ku, Osaka, Japan, a corporation of Japan
Filed Oct. 4, 1962, Ser. No. 228,307
Claims priority, application Japan Mar. 19, 1959
5 Claims. (Cl. 18—54)

This invention is a continuation in part application of U.S. Serial No. 14,271, filed March 11, 1960, now abandoned.

This invention relates to a method of recovering and reusing water and solvents for the production of shaped articles of acrylonitrile polymerization products from the waste coagulating liquor. More particularly, this invention relates to a cyclic process wherein a shaped acrylonitrile polymerization product which has left a coagulating bath is washed with counter-currently flowing water and the used water is returned to the bath, while a part of said coagulating bath liquor is taken off and fed to a distillation system. Nitric acid portion included in the coagulating bath liquor is recovered by this distillation in the form of concentrated nitric acid which is reused to dissolve acrylonitrile polymerization product. Water in the coagulating bath liquor is also recovered as top distillate in the distillation and is reused for washing above-described shaped acrylonitrile polymerization product immediately after spun and/or for adjusting nitric acid concentration of the coagulating bath liquor.

An object of the present invention is to provide an efficient and safe treatment of the solvent and the coagulating bath solution in a method of producing shaped articles from acrylonitrile polymerization products, said method including the uses of a concentrated aqueous nitric acid solution as a solvent for acrylonitrile polymerization products and a dilute aqueous nitric acid solution as a coagulating bath solution for acrylonitrile polymerization products.

Another object of the present invention is to provide a cyclic process which comprises recovery of water in the coagulating bath solution, washing of the shaped gel of acrylonitrile polymerization products which has left the coagulating bath with the recovered water counter-currently flowed, and return of the used water to the coagulating bath.

Still another object of the present invention is to provide a method of recovery and reuse of the solvent nitric acid which is dissolved out from the starting solution of acrylonitrile polymerization product into the coagulating bath solution.

Other objects, features, capabilities and advantages as comprehended by this invention will be apparent from the description and claims which follow.

In the drawing, FIG. 1 shows a general schematic view of an apparatus to carry out the present invention.

Acrylonitrile polymerization products which may be employed in the present invention include polyacrylonitrile and copolymers and inter-polymers of acrylonitrile with other polymerizable substances, for example vinyl or acrylic compounds, in which at least 80% by weight of the polymer is acrylonitrile. In the present invention shaped articles produced from the above acrylonitrile polymerization products include filaments (mono- and multifilaments), yarns, films, ribbons, sheets, rods, tubes, etc.

The term "a concentrated aqueous nitric acid solution" and similar expressions employed in the present specification mean that they are an aqueous solution containing more than 53% by weight of nitric acid.

The term "a dilute aqueous nitric acid solution" and similar expressions employed in the present specification mean that they are an aqueous solution containing less than 50% by weight of nitric acid.

Heretofore we have found that polyacrylic resin containing at least 80% by weight of acrylonitrile is well dissolved in a concentrated nitric acid solution having the concentration of more than 53% by weight of nitric acid, to produce a satisfactory spinning solution. We have also found that in subjecting the aforesaid spinning solution to wet spinning, a nitric acid solution having the concentration of 20% to 50% by weight, preferably 30% to 35% by weight, of nitric acid is successfully used as a coagulating bath solution.

In order to maintain at all times a uniform composition of the coagulating bath (its nitric acid concentration is 20% to 50%) in the above mentioned wet spinning process, it is necessary to dilute the coagulating bath solution by adding water, the amount of which corresponding to that of the spinning solution extruded through spinnerettes into the coagulating bath.

We have found that the excessive coagulating bath solution, as mainly composed of nitric acid and water, occasionally contains small amount of impurities such as acrylonitrile polymer (mainly lower polymerization degree acrylonitrile polymer) which has precipitated in the coagulating bath on spinning, various metallic ions resulting from the corrosion of the apparatus, and other impurities which have been present in acrylonitrile polymerization products as a starting material. Among these impurities, the lower polymerization degree acrylonitrile polymer may be converted according to the following reaction formulas:

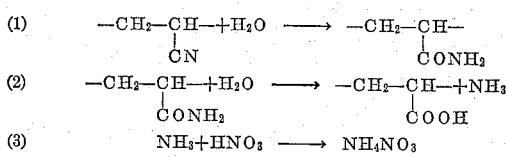

Such conversion may occur due to the lapse of time or the increase of temperature. That is to say, the acrylonitrile polymer may be hydrolyzed with nitric acid and consequently liberated nitrogen containing component may form ammonium nitrate. The polymers which result from the reactions of the Equations 1 and 2 are water soluble. But these polymers, if heated for a long period time, may be converted to a degenerated, unknown substance which deposits on the wall of a vessel or the heated surface.

As well known for one skilled in the art, it is very dangerous that ammonium nitrate is heated along with a certain organic substance (in this case the degenerated acrylonitrile polymer), because of great possibility of explosion.

In the commercial production of shaped acrylonitrile articles by dissolving acrylonitrile polymerization product into a concentrated aqueous nitric acid solution, extruding said solution into a dilute aqueous nitric acid solution (coagulating bath), there are problems to be solved: (a) the most advantageous method for maintaining the nitric acid concentration in the coagulating bath at constant level, (b) means for recovering a large volume of water which was used to wash the shaped articles extruded in the form of spun fiber and (c) a safe and advantageous treatment method of a large volume of an excess, waste coagulating bath solution containing a small amount of organic substances as well as a large amount of nitric acid, resulting from coagulation of the spinning solution in a coagulating bath. Unfortunately we have not yet heard or found a favorable method in any literatures. It is reported that, about 1940 at Oppau factory in Germany, nitric acid is prepared by conducting absorption until HNO₃ concentration is 40–45% and then concentrating the absorbed HNO₃ up to 60%. It is further reported that the process is not practiced, because welded portions of heating means of an apparatus (made of stainless steel) are corroded within only 2 months. In distillation and concentration of nitric acid containing ammonium nitrate and other organic substances, especially as in the process of this invention, more corrosion of the equipment will readily be anticipated. In addition, because of the explosion accidents experienced as above-mentioned, concentration of nitric acid by distillation as a matter of fact has not been carried out in the technical field for those skilled in the art before the present invention.

We have now accomplished a process which eliminates the above-mentioned problems of (a), (b) and (c).

The present invention is characterized by a combination of the following features:

(1) Preparation of an original solution by dissolving acryl polymer in nitric acid of more than 53% (preferably 63 to 75%);

(2) Spinning of the original solution in a coagulating bath having a nitric acid concentration of 20 to 50% (preferably 30 to 35%);

(3) Washing the spun filaments with a counter-currently flowing water and top distillate (water containing less than 0.5% nitric acid) from a distillation column, and washing and recovering coagulated liquid remaining in the filaments;

(4) Mixing an overflowing portion of the coagulating bath solution of (2) with recovered wash water of (3) in a tank, recycling the major portion thereof in the coagulating bath and transferring the excess solution of coagulating bath in this system to a distillation step;

(5) In a distillation column, the latter solution is separated into three parts, namely, (a) water containing less than 0.5% nitric acid which is recovered at the still top (this is reused as washing water of paragraph (3)), (b) nitric acid of more than 53% recovered from the gas phase of the still bottom and (c) a mixture of nitric acid, ammonium nitrate and organic substances (these are discarded from the still bottom). The concentration of nitric acid withdrawn from the gas phase portion of the still bottom should be more than 53%, which is used for dissolving the polymer of paragraph (1), the liquid portion of the still bottom is exhausted continuously or in batchwise outside the system at above 120° C. and below 130° C.

(6) All of above-mentioned operations are carried out under normal pressure.

Now we have found that if the operation of distillating the excessive coagulating solution (or waste acid) is carried out at the temperature below 130° C., there is no hazard of explosion. This is a surprisingly valuable discovery of the present inventors and we have completed the process of this invention on these knowledges in combination with several conditions.

Then, the process according to the present invention will be described. As aforementioned, in the present method wherein water is recovered as top distillate from the still column and nitric acid is condensed and then recovered as a concentration corresponding to the azeotropic mixture with water (approximately 68%) being withdrawn from the gas phase portion of the still bottom. By continuing the heating, concentration and distillation operations (with the progress of time), such materials as nitric acid, acrylonitrile polymer, ammonium nitrate and unknown materials resulting from hydrolysis of a portion of said acrylonitrile polymer with nitric acid are accumulated in the still bottom. The concentration of these materials increases gradually as the time goes on. At the same time, the boiling temperature of this mixture increases accordingly. We have found that there is a relationship between the boiling temperature and the content of the salts and the decomposition products in the mixture, as shown in the following table:

| Ratio of concentration of residual liquid to waste acid (weight/weight) | 1/50 | 1/100 | 1/150 | 1/200 | 1/250 | 1/300 | 1/400 |
|---|---|---|---|---|---|---|---|
| Ammonium nitrate (percent by weight) | 1.4 | 2.3 | 4.2 | 5.1 | 8.0 | 9.7 | 13.2 |
| Organic substance (percent by weight) | 1.1 | 1.8 | 1.8 | 3.2 | 4.1 | 4.8 | 5.4 |
| Boiling point (° C.) | 121 | 122 | 123 | 125 | 127 | 130 | 138 |

In accordance with this new discovery, we have confirmed that the risk of explosion is avoided by controlling the boiling temperature of the mixture at less than 130° C. so as to maintain less than 10% content of salts and decomposition products in the mixture. In order to control the boiling temperature of the mixture in the still bottom at less than 130° C., the mixture may be withdrawn from the still bottom continuously or in batchwise before the boiling temperature of the mixture accumulated in the still bottom reaches 130° C.

However the boiling temperature of the mixture should be more than 120° C. since concentration distillation of nitric acid is carried out under normal pressure in the process of this invention. Though evaporation of nitric acid at less than 120° C. must be carried out under reduced pressure, and azeotropic point of nitric acid and water is transferred to that at low concentration, when the reduced pressure is employed. Several drawbacks are seen in that the recovery of concentrated nitric acid is difficult, necessitating vacuum equipment which is expensive. In the present invention, however, distillation is carried out under normal pressure, thus obviating the need for reduced pressure distillation equipment.

Accordingly one of the characteristics of the present invention is to provide a safe and economically advantageous operation for the distillation of the mixture which contains nitric acid, ammonium nitrate and nitric acid hydrolyzed product of acrylonitrile polymer.

In accordance with the present invention, less than 0.5% nitric acid-containing water is recovered as top distillate from the still column and the nitric acid-containing water is cyclically used as the counter-currently flowing water for washing the spun fiber which is accompanied by small amount of nitric acid, and then the nitric acid containing water is fed to the coagulating bath after said washing (the spun fiber) to adjust the concentration of a coagulation bath. It serves as an aid of the nitric acid recovery which is a principal object of the present invention. Thus a small amount which is contained in the top distillate of the still column is advantageously recovered and reused.

On the other hand, nitric acid having such concentration that it is approximately similar to that of the azeotropic mixture of nitric acid and water is withdrawn in gas phase from the gas phase portion of the still bottom and concentrated to nitric acid. The recovered nitric acid is purer than commercially available nitric acid, and it is suitably used as a solvent for dissolving acrylonitrile polymerization product.

Now the present invention will be explained with reference to the accompanying drawing.

A spinning solution, passed through a feeding pipe 1, is extruded through a spinneret 2 having multiple holes into a coagulating bath 3. Then the coagulated fiber is gathered in the form of tow. Then the fiber is passed through a tank 4, which consists of six stages for the recovery of a coagulating bath solution remaining on the spun fiber, and is passed through one stage after another in such a manner that the fiber is squeezed between pairs of compression rolls 5 a pair of which is provided for each of said stages, and then transferred to the next stage. At the same time, slightly acidic water which is the top distillate from a still column 16 is introduced into tank 4 at the end 6 thereof, from which end the fiber is discharged, so that the top distillate passes through tank 4 in counter-current direction to the fiber. Thus the nitric acid concentration of the recovered water (the top distillate) gradually increases and the coagulating bath solution remaining on the fiber is advantageously recovered. The recovered coagulating bath solution is passed through a pipe 7 into a mixing tank 8 in which the concentration of said bath solution is adjusted and which is provided wtih stirring blades 9. The coagulating bath solution having an adjusted concentration is circulated from tank 8 through a pump 10 and a pipe 11 to the coagulating bath 3. While the spinning operation is in progress, the excessive coagulating bath solution from the bath 3 flows through pipe 12 to tank 8 and is fed from there through a downtake pipe 13, a pump 14 and an inlet pipe 15 into a certain position of still column 16. In the still column, Raschig rings 17 are filled over multiple stages, whereby greater efficiency is realized in a distilling operation. The nitric acid concentration in the still column gradually increases in the direction from the upper part of the column to the bottom part. In connection with the top of the still column, there is a surface condenser 18. Cooling water is introduced through a pipe 19 into the surface condenser and exhausted through a pipe 20. The condensed water (slightly acidic) leaves the condenser through a pipe 21, but a part of said water is refluxed again through pipe 22 into the still column. Most of said water is delivered through a pipe 23, a pump 24 and a pipe 25 to the tank 4. Surface condenser 26, connected with the bottom of the still column, is provided for the azeotropic mixture of nitric acid and water.

In this surface condenser, cooling water is introduced through a pipe 27 and exhausted through a pipe 28. The condensed nitric acid is collected through a pipe 29 and reused as a solvent. In a reboiler 30, steam is introduced through a pipe 31 and exhausted as drain through a pipe 32. The heated waste acid is circulated in a cycle consisting of a pipe 33, the bottom part of the still column, and the reboiler. If the cooling point of the waste liquor of the still column arrives at 130° C., said waste liquor should be removed through an exhaust pipe 34 from the still column, whereby safe operation can be guaranteed.

The condensed nitric acid, which is collected through the pipe 29 is gathered in a reservoir tank 35, and then fed through a pump 36, and a pipe 37 to a concentration control tank 38. A new charge of concentrated nitric acid—for instance 98% and up—is fed to the concentration control tank through a pipe 39, and is mixed therein with the condensed acid fed through the pipe 37, for regulating the concentration of the solution to be suitable as solvent for acrylic polymer and making up for the circulation loss of acid.

The adjusted solvent is fed through a pump 40, and a pipe 41 to a solving tank 42. Acrylic polymer is also fed to the solving tank through an inlet hopper 43.

In the tank, polymer and solvent are mixed to form spinning solution. The spinning solution is fed through a pump 44 and a pipe 45 to a solution tank 46 and then through a pump 47 to the feeding pipe 1.

The following examples describe the principle of the invention, but are not to be construed as limiting its scope.

The salient advantages of the present invention are therefore:

(A) Recovery and reuse of the water and the nitric acid solvent, in high efficiency;

(B) Recovery of the nitric acid solvent *safely and easily;*

(C) Recovery of the nitric acid solvent of high purity.

With respect to item (A): The water distilling out at the still top and containing less than 0.5% of nitric acid is utilized as wash water for acrylonitrile polymerization products leaving the coagulating bath, and is recycled and recovered. By these steps, it is possible to recover the water and the solvent in high yield, to prevent losses and to lower the manufacturing cost of acrylonitrile polymerization products. The yield of the overall process reaches the outstanding rate of more than 96%, which greatly contributes to lowering the manufacturing cost of acrylontrile polymerization products.

With respect to item (B): Great pains have been taken by us to recover the solvent *safely and easily.* When the coagulating solution is distilled, the polymer which is contained in the coagulating bath solution and the catalyst which remains in the polymer are accumulated at the still bottom. Furthermore, since the polymer is hydrolyzed to form the highly dangerous ammonium nitrate, and organic substances, it is necessary to prevent accumulation thereof to achieve safe operation.

We have discovered that it is necessary to ascertain to keep ammonium nitrate at a concentration below 10% and therefore maintain the still bottom temperature at between 120° and 130° C. and preferably 122° and 130° C.

More particularly, we have invented a method for intermittently withdrawing the still bottom liquid when ammonium nitrate attains a rate of less than 10%, that is, the still bottom temperature reaches 130° C., or continuously withdrawing waste acid, maintaining the temperature between 120° and 130° C.

With respect to item (C): Our improved process makes it possible to recover nitric acid of the highest quality by withdrawing and recovering nitric acid from the gaseous phase near the still bottom.

*Example*

The spinning solution, prepared by dissolving 1 t. of polyacrylonitrile having an average polymerization degree of 1100 into 7 t. of a solution containing 68% by weight of nitric acid and 0.2% by weight of urea, was subjected to wet spinning through a coagulating bath containing 31.8% by weight of nitric acid and being at a temperature of 0° C., thereby 15 t. of an excessive coagulating bath solution were obtained. The analysis showed that the bath solution contained small amounts of precipitated and dissolved polymers which may be low polymerization degree substance of raw acrylonitrile and small amount of various metallic ions together with water and nitric acid. This solution or waste acid is distilled in a titanium-lined still column. The fractionated and condensed water containing 0.2% to 0.5% by weight of nitric acid was recovered from the top part of the still column, and 62% to 67% by weight of nitric acid was obtained by condensation of the vapor of the still bottom through the surface condenser. At this time, the concentration ratio varied from 1/50 to 1/300, while the boiling point of the waste liquor of the still bottom was elevated from 120° C. to about 130° C. The degenerated polyacrylic resinous substance partially deposited on the wall of the still column, but the deposition was easily exfoliated by washing with 30% by weight of nitric acid. On the other hand, the tow of the spun fiber which had left a coagulating bath was compressed with rolls. This tow, which contained yet 4 parts by weight of the coagulating bath solution based on the weight of the spun fiber, was charged to washing machine equipped with 12 stages of compression rolls, and the tow corresponding to one ton of fiber was sequently washed with 12 t. of water, which was 8 t. of the aforesaid fractionated water plus 4 t. of additional pure water, flowing counter-currently in the direction of the tow. When the water-washed tow, in which the remaining coagulating bath solution had been replaced with the washing water, came out of the washing machine, 96% of the remaining acid is recovered and the thread contained a minor amount of nitric acid and four parts by weight of water based on the weight of the threads. Thus, 12 t. of water were used to wash one ton of the spun fiber, and among 12 t., 4 t. of water remaining on the fiber were transferred to the next step, and the remainder or 8 t. of water contained the coagulating bath solution remaining on the fiber and were subsequently added to the coagulating bath. A concentrated acid delivered from spinning nozzle was diluted by the addition, whereby the nitric acid concentration of the coagulating bath was maintained constantly at 31.8% by weight.

Average 65% by weight of nitric acid which was fractionated as the bottom distillates contained no impurities but a small amount of nitrous acid, and it was purified with the addition of urea. The purified acid was added with new concentrated nitric acid corresponding to several percent of the circulating loss of the acid to reuse as a solvent for acrylonitrile polymerization product. Commercially available concentrated nitric acid usually contains a minor of sulfate radical and metallic ion. Such metallic ion sometimes has a significant influence on the rate of hydrolysis of the polyacrylic resin in the spinning solution. More than 90% by weight of the acid employed for dissolving polyacrylonitrile is pure nitric acid free from undesirable substances, and therefore this provides very great convenience in managing the spinning operation.

While the invention has, for convenience, been described in connection with wet spinning of acrylic fiber, it is to be understood that many different embodiments of the invention may be made without departing from the spirit and scope thereof.

What we claim is:
1. A process for recovering nitric acid and water from an excess solution of coagulating bath which is produced in making shaped acrylonitrile polymerization products which are at least 80% acrylonitrile by extruding said acrylonitrile polymerization product dissolved in an aqueous nitric acid solution containing more than 53% by weight of $HNO_3$, into a nitric acid coagulating bath containing from 20 to 50% by weight of nitric acid, which process comprises

What we claim is:
(1) transferring the excess solution of coagulating bath to a distillation step,
(2) heating said excess solution at a temperature between 120° C. and 130° C. in said distillation step,
(3) recovering water containing less than 0.5% by weight of nitric acid at the still top,
(4) recovering nitric acid of more than 53% by weight by withdrawing said nitric acid from the gas phase of the still bottom, and
(5) exhausting from the still bottom a mixture containing nitric acid, ammonium nitrate, hydrolyzed products of acrylonitrile polymerization product and other dissolved materials.

2. A process according to claim 1, wherein top distillate water containing less than 0.5% by weight of nitric acid is reused to wash shaped articles extruded in the form of spun fiber.

3. A process according to claim 1, wherein the top distillate is used for adjusting the nitric acid concentration of the coagulating bath after having been used to wash the shaped articles extruded in the form of spun fiber.

4. A process according to claim 1 wherein the aqueous nitric acid solution having the concentration of more than 53% by weight which has been withdrawn from the gas phase of the still bottom is reused as a solvent for dissolving the acrylonitrile polymerization product.

5. A process according to claim 1, wherein the boiling temperature of the still bottom is maintained between 122° C. and 130° C.

References Cited in the file of this patent
UNITED STATES PATENTS

| 2,761,761 | Congdon et al. | Sept. 4, 1956 |
| 2,878,097 | Halbig | Mar. 17, 1959 |
| 2,999,009 | Bechtel et al. | Sept. 5, 1961 |

FOREIGN PATENTS

| 1,226,284 | France | Feb. 22, 1960 |